United States Patent
Burugula et al.

(10) Patent No.: US 10,684,959 B2
(45) Date of Patent: Jun. 16, 2020

(54) SHARED MEMORY IN A VIRTUAL ENVIRONMENT

(71) Applicant: International Business Machines Corporation, Armonk, NY (US)

(72) Inventors: Ramanjaneya S. Burugula, Yorktown Heights, NY (US); Niteesh K. Dubey, Yorktown Heights, NY (US); Joefon Jann, Ossining, NY (US); Pratap C. Pattnaik, Ossining, NY (US); Hao Yu, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/240,857

(22) Filed: Jan. 7, 2019

(65) Prior Publication Data

US 2019/0155745 A1 May 23, 2019

Related U.S. Application Data

(63) Continuation of application No. 15/210,348, filed on Jul. 14, 2016, now Pat. No. 10,176,115.

(51) Int. Cl.
*G06F 12/109* (2016.01)
*G06F 9/50* (2006.01)

(52) U.S. Cl.
CPC .............. *G06F 12/109* (2013.01); *G06F 9/50* (2013.01); *G06F 2212/1041* (2013.01); *G06F 2212/657* (2013.01)

(58) Field of Classification Search
CPC ........... G06F 12/109; G06F 2212/1008; G06F 2212/1041; G06F 2212/657
See application file for complete search history.

(56) References Cited

U.S. PATENT DOCUMENTS

| 5,117,350 A | ‡ | 5/1992 | Parrish | G06F 12/0284 711/1 |
| 6,247,109 B1 | ‡ | 6/2001 | Kleinsorge | G06F 9/461 711/15 |

(Continued)

FOREIGN PATENT DOCUMENTS

| EP | 2283429 B1 | ‡ | 7/2015 | ......... G06F 12/1475 |
| EP | 2283429 B1 | | 7/2015 | |

(Continued)

OTHER PUBLICATIONS

Burugula, et al., "Invalidation of Shared Memory in a Virtual Environment," U.S. Appl. No. 16/125,989, filed Sep. 10, 2018.‡

(Continued)

*Primary Examiner* — Baboucarr Faal
*Assistant Examiner* — Jane Wei
(74) *Attorney, Agent, or Firm* — Robert J. Shatto

(57) ABSTRACT

A server LPAR operating in a virtualized computer shares pages with client LPARs using a shared memory region (SMR). A virtualization function of the computer receives a get-page-ID request associated with a client LPAR to identify a physical page corresponding to a shared page included in the SMR. The virtualization function requests the server LPAR to provide an identity of the physical page. The virtualization function receives a page-ID response comprising the identity of a server LPAR logical page that corresponds to the physical page. The virtualization element determines a physical page identity and communicates the physical page identity to the client LPAR. The virtualization element receives a page ID enter request and enters an identity of the physical page into a translation element of the computer to associate a client LPAR logical page with the physical page.

20 Claims, 6 Drawing Sheets

(56) References Cited

U.S. PATENT DOCUMENTS

| | | | | |
|---|---|---|---|---|
| 6,877,158 | B1 ‡ | 4/2005 | Arndt | G06F 12/0284 711/20 |
| 7,089,377 | B1 ‡ | 8/2006 | Chen | G06F 12/1036 711/14 |
| 7,111,145 | B1 ‡ | 9/2006 | Chen | G06F 12/1036 711/20 |
| 8,521,966 | B2 ‡ | 8/2013 | Wibling | G06F 9/5016 711/14 |
| 9,648,045 | B2 ‡ | 5/2017 | Mooring | G06F 9/45558 |
| 9,665,498 | B2 ‡ | 5/2017 | Kiriansky | G06F 12/10 |
| 9,697,053 | B2 ‡ | 7/2017 | Jiang | G06F 9/5088 |
| 9,940,167 | B2 ‡ | 4/2018 | Tsirkin | G06F 9/5016 |
| 2008/0270680 | A1 ‡ | 10/2008 | Chang | G11C 16/10 711/10 |
| 2009/0276200 | A1 ‡ | 11/2009 | Beyer | G06F 11/261 703/13 |
| 2009/0307445 | A1 ‡ | 12/2009 | Jacobs | G06F 11/0712 711/15 |
| 2009/0307538 | A1 ‡ | 12/2009 | Hernandez | G06F 11/0712 714/54 |
| 2010/0023941 | A1 * | 1/2010 | Iwamatsu | G06F 12/109 718/1 |
| 2010/0191923 | A1 * | 7/2010 | Archer | G06F 12/1036 711/154 |
| 2011/0307663 | A1 ‡ | 12/2011 | Kultursay | G06F 17/5045 711/12 |
| 2012/0246388 | A1 ‡ | 9/2012 | Hashimoto | G06F 12/0246 711/103 |
| 2013/0054934 | A1 * | 2/2013 | Mitsugi | G06F 12/1408 711/203 |
| 2013/0339953 | A1 ‡ | 12/2013 | Wibling | G06F 9/5016 718/1 |
| 2014/0108701 | A1 * | 4/2014 | Liljeberg | G06F 12/1441 711/6 |
| 2015/0026678 | A1 ‡ | 1/2015 | Imada | G06F 9/45533 718/1 |
| 2015/0205729 | A1 ‡ | 7/2015 | Bates | G06F 12/1081 710/26 |
| 2018/0018098 | A1 | 1/2018 | Burugula et al. | |
| 2018/0018273 | A1 | 1/2018 | Burugula et al. | |
| 2019/0004707 | A1 | 1/2019 | Burugula et al. | |

FOREIGN PATENT DOCUMENTS

| | | | | |
|---|---|---|---|---|
| GB | 2331385 A | ‡ | 5/1999 | G06F 3/0607 |
| GB | 2331385 A | | 5/1999 | |
| WO | 2013102532 A3 | | 7/2013 | |
| WO | WO-2013102532 A3 | ‡ | 7/2013 | G06F 9/45541 |

OTHER PUBLICATIONS

List of IBM Patents or Patent Applications Treated as Related, Sep. 7, 2018, 2 pgs.‡

Enoki, et al., "Memory-Efficient Index for Cache Invalidation Mechanism with OpenJPA", WISE 2012, LNCS 7651, pp. 696-703, 2012. © Springer-Verlag Berlin Heidelberg 2012.‡

Diakhate, et al., "Efficient shared memory message passing for inter-VM communications", HAL archives-ouvertes, Mar. 17, 2009. 11 pages.‡

Van Hensbergen, "P.R.O.S.E.: Partitioned Reliable Operating System Environment", IBM Research Report, RC23694 (W0508-91) Aug. 16, 2005. 5 pages.‡

Burugula, et al., "Invalidation of Shared Memory in a Virtual Environment", U.S. Appl. No. 15/210,275, filed Jul. 14, 2016.‡

List of IBM Patents for Patent Applications Treated as related, Jul. 13, 2016. 2 pages.‡

List of IBM Patents or Patent Applications Treated as Related, Jan. 6, 2019, 2 pgs.

\* cited by examiner
‡ imported from a related application

SHARED MEMORY IN A VIRTUAL ENVIRONMENT

BACKGROUND

The present disclosure relates to virtualized server environments. More specifically, the disclosure relates to sharing memory pages of a server logical partition or virtual machine with client logical partitions or virtual machines.

SUMMARY

According to embodiments of the present disclosure (hereinafter "the disclosure"), a computer includes a plurality of logical partitions (LPARs) that can share a physical memory page. A method for sharing the physical memory page includes receiving a get-page-ID request, which includes an identity of a shared page and the identity of a shared memory region (SMR). The SMR is associated with a first LPAR among the plurality of LPARs, and the shared page is included in the SMR. The get-page-ID request is associated with a second LPAR also included in the plurality of LPARs.

In response to the get-page-ID request, the method includes communicating to the first LPAR, based on the identity of the SMR, a request to identify a physical page corresponding to the shared page. In response to communicating the request to identify the physical page to the first LPAR, the method further includes receiving a page-ID response. The page-ID response comprises the identity of a first logical page included in a set of logical pages associated with the first LPAR. The first logical page further corresponds to the shared page and to the physical page. In response to the page-ID response, the method includes communicating a first identity of the physical page to the second LPAR.

Receiving an enter-page-ID request is included in the method. The enter-page-ID request includes an identity of a second logical page included in a set of logical pages associated with the second LPAR, and further includes the first identity of the physical page. In response to the enter-page-ID request, an embodiment enters a second identity of the physical page into an address translation element. The second identity is based on the first identity of the physical page and the address translation element operates to translate the identity of the second logical page to the second identity of the physical page.

In some embodiments, the method includes receiving a registration request associated with the SMR and the first LPAR. In response to the registrations request, the method determines the SMR identifier and communicates the SMR identifier to the first LPAR. Also, in some embodiments, the first identity of the physical page is an encrypted page number that corresponds to the physical page. In communicating the first identity to the second LPAR, the method includes generating the encrypted page number. In entering the second identity into the address translation element, the method includes converting the encrypted page number to a physical page number and entering the physical page number into the address translation element.

A system embodying the disclosure comprises a computer having a memory and a plurality LPARs. A first and second LPAR are included among the plurality of LPARs. An SMR, comprising a set of shared pages, is associated with the first LPAR. A shared page included in the SMR corresponds to a physical page included in memory of the computer. The system includes an address translation element to translate an identity of a logical page to an identity of a physical page included in the memory. The system further includes a processor configured to perform methods of the disclosure.

A computer programming product embodying the disclosure comprises programming instructions to cause a processor to perform methods of the disclosure.

The above summary is not intended to describe each illustrated embodiment or every implementation of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
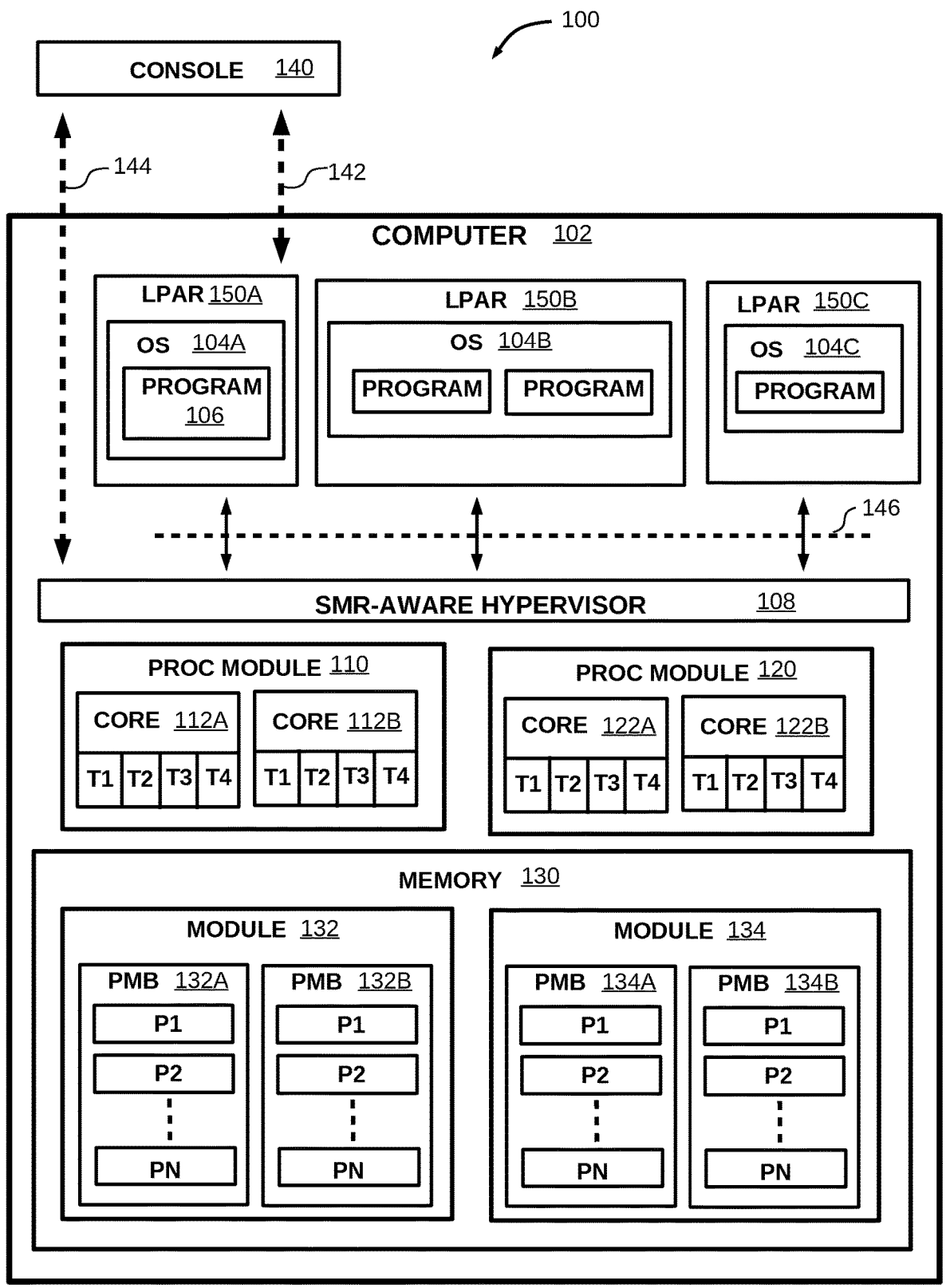
FIG. 1 is a block diagram illustrating a computer, according to aspects of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure (hereinafter, "the disclosure") relate to virtualized computing environments having a plurality of logical partitions (LPARs). More particular aspects relate to applications executing in an operating system of one logical partition sharing memory pages of an application executing in an operating system of another logical partition. While the present disclosure is not necessarily limited to such uses, aspects of the disclosure may be appreciated through a discussion of various examples using this context.

A computer in a computing system can include virtualized instances of physical resources of the computer. A computer can virtualize resources such as physical processors, physical blocks of memory, I/O devices or network interfaces, and/or storage media or devices, for example. As used herein, "computer" refers to any form of computing device capable of virtualizing physical resources, for example: server computers, desktop or laptop computers, and mobile devices (e.g., a tablet or mobile phone).

Virtualizing physical resources of a computer is one means by which a computer can "partition" the physical resources of the computer to allocate, or share, portions of the physical resources among a plurality of "partitions" of the computer. As used herein, a "partition" comprises a self-contained computing environment that contains at least one processor and, optionally, memory resources sufficient to enable programs to execute within that environment independently of programs operating in other partitions of the same computer. Correspondingly, "logical partition (LPAR)" is used herein to refer to a partition of a computer that includes at least some virtualized resources of the computer.

LPARs, and other forms of logical partitions, are also in some embodiments called "virtual machines (VMs)", and it will be understood by one of ordinary skill in the art that a VM having at least some virtual resources, and an LPAR, are interchangeable within the scope of the disclosure. For purposes of illustrating the disclosure, but not limiting to embodiments, reference to an "LPAR" is further understood herein to refer inclusively to an OS, or other program, operating within the LPAR.

An LPAR is not limited to only virtual resources, and can include any combination of virtual and/or physical resources. For example, an LPAR can include only physical processors, only virtual processors, or a combination of some physical and some virtual processors. An LPAR can include only virtual memory (e.g., one or more virtual memory pages), only physical memory (e.g., one or more pages within a physical memory), or a combination of some physical and some virtual memory resources. An LPAR can have other forms of virtual resources in addition to virtual processors and/or memory, including virtual network interfaces and/or virtual storage (e.g., virtual hard drives). A "virtualized computer", as used herein, refers to a computer in which physical resources of the computer are virtualized, or partitioned, and allocated to one or more LPARs (or, VMs) operating in the computer.

In a computer, physical processors can be embodied as processor modules, processor modules can contain one or more processor cores, and processor cores can include a plurality of processor threads (e.g., threads of a multi-threaded processor core). A processor thread can be an execution unit within a processor core and can be wholly, or partially, independent of other threads within that core (or, other cores within the same or other processor modules). A computer can virtualize a physical processor as, for example, a time-sliced fraction of a physical processor (e.g., core or thread), a subset of physical cores of one or more physical processor modules, and/or a subset of threads of one or more physical processor cores or modules. As used herein, "processor" refers to any of the various forms of implementing a physical or virtual processor in a computer.

Processors can execute instructions from and/or read or write data in a memory of a computer. A computer can include a single memory, or can include a plurality of memories and each memory can have a different function, or role, within the computer. For example, one memory can be a main memory, and other memories can be cache memories, such as L1, L2, or L3 caches. Memories can be implemented using various electronic technologies, including, for example, semiconductor Dynamic Random Access Memory (DRAM) or flash memories.

A physical memory of a computer can be embodied as one or more physical memory modules, a memory can be organized as physical memory blocks (PMBs), and the PMBs can be comprised of physical memory pages. A PMB can be a portion of a memory module or, alternatively, can span a plurality of memory modules, according to the relative sizes of memory modules and PMB. A memory module and/or a PMB can each have a size, for example, that is a power of 2, such as 4 GB, 256 GB, or 1 TB, and the sizes of PMBs can be different from each other and from that of a memory module. In embodiments of the disclosure (hereinafter, "embodiments"), pages comprising a PMB can be, for example, a power of 2 size, such as 4K, 16K, and/or 64K bytes.

A computer can virtualize physical memory by mapping a "logical" memory block (LMB) to one or more PMBs or, alternatively, to a sub-portion of a PMB (e.g., a particular set of contiguous pages of a PMB). It can be convenient, in an embodiment, to associate an LMB of a particular size to a corresponding contiguous region of a PMB having the same size. However, an embodiment can associate any particular set of pages of one or more PMBs with any particular LMB, and need not necessarily form an LMB of contiguous pages of any one PMB, or contiguous PMBs.

An LMB can be comprised of logical pages, and an embodiment can have a size of a logical page, within an LMB, that is identically the size of a page in a PMB. Alternatively, an embodiment can have a logical page size larger than the size of a physical page. For example, an embodiment can have a logical page size of 64 KB which in turn can map, for example, to 16 contiguous 4 KB pages within the portion of the PMB mapped by the LMB. Logical pages within an LMB can have a logical address (or, "Logical Page Number," LPN) corresponding, or "mapped", to the physical address (or, "Physical Page Number," PPN) of a page of a PMB.

FIG. 1 depicts an example computer system, 100, according to embodiments of the disclosure. Computer 102 can be a virtualized computer and includes processor modules 110 and 120, each of which contains a plurality of processor cores, such as 112A, 112B, 122A and 122B. Each of the processor cores in turn have processor threads, such as threads T1-T4 in each of processor cores 112A, 112B, 122A and 122B. Computer 102 includes memory 130, which is comprised of memory modules 132 and 134, which in turn are organized as PMBs, such as 132A and 132B. The PMBs can be further organized as pages (e.g., P1 through PN). For example, PMB 132A can be a 256 GB block of memory organized as contiguous 4 KB physical pages.

A virtualized computer can include a plurality of LPARs, and the LPARs can include programs, such as operating systems (OSes), that can further include other programs. To illustrate, computer 102 is virtualized to include LPARs 150A-150C, which in turn include OSes 104A-104C, respectively. The OSes further include programs, such as program 106 of OS 104A.

While not shown in FIG. 1, a computer can also include I/O devices and/or interfaces, such as storage devices (e.g., disk or flash drives), network interfaces, input devices such as a mouse or keyboard, and/or output devices such as displays or printers, or interfaces to these devices, for example. A computer, or a component thereof (e.g., a physical processor module, or an Application Specific Integrated Circuit, or "ASIC"), can interconnect processors, memory, and I/O devices or buses by means of I/O buses or links, such as, for example, PCI-Express, SATA or SAS, Fibre Channel, and Ethernet. For example, while not shown in FIG. 1, computer 102 can have a variety of such I/O devices and the I/O devices can be connected to the processors and/or memory of computer 102 by means of I/O buses or links. A virtualized embodiment of computer 102 can include virtualized processors, virtualized memory, and/or virtualized I/O devices and/or virtualized storage.

Partitioning and virtualizing physical resources can isolate the physical resources corresponding to virtual resources allocated to one LPAR from those corresponding to virtual resources allocated to another LPAR. For example, a virtual processor can correspond to particular threads of core 112A and an LMB can correspond to PMB 134A (or, a portion thereof) and LPAR 150A can be assigned, or "allocated", the virtual processor and the LMB for its exclusive use. The computer can restrict other LPARs, such as 150B and 150C, from access to the physical processor threads of core 112A, and physical memory pages of PMB 134A, corresponding to the virtual processor and LMB allocated to LPAR 150A.

A virtualized computer can include a virtualization component, which can operate to create the virtual instances of the resources, and to allocate those virtual resources (e.g., virtual processors and/or virtual memory) to LPARs, or otherwise manage those virtual resources (e.g., modify their size or correspondence to particular physical resources). In an embodiment, a "hypervisor" can be a component of a virtualized computer that creates and/or manages the virtual resources. As illustrated in FIG. 1, computer 102 includes a hypervisor, SMR-aware hypervisor 108, which can virtualize resources such as processors in processor modules 110 and 120, or PMBs in memory modules 132 and 134. An "SMR-aware" hypervisor can embody features and/or aspects of the present disclosure, such as are described in reference to FIGS. 3A, 3B, 4, and 5. "Hypervisor", as used hereinafter, refers to any form of a hypervisor that is SMR-aware so as to embody one or more features and/or aspects of the disclosure.

A hypervisor can be a "built-in" component of a virtualized computer, such as firmware included in the computer and operating in modes of the computer having particular privileges (e.g., access to privileged processor instructions) compared to other programs of the computer (e.g., programs operating within an LPAR). In other embodiments, a hypervisor can be a program of an LPAR (e.g., an operating system), in which that LPAR has particular privileged operating modes (e.g., access to privileged processor instructions) compared to other LPARs.

As used herein, for purposes of illustrating the disclosure, but not limiting to embodiments, a "hypervisor" refers to any embodiment of a virtualization component of a virtualized computer, or in communication with a virtualized computer, that operates to partition, or otherwise virtualize, the physical resources of the computer, and/or to manage allocation or use of the virtual and/or physical resources of the compute by LPARs.

A hypervisor can virtualize physical processors of a computer. Hypervisor 108, for example, can create virtual processors corresponding to the processor cores, threads, or fractions thereof, of processor modules 110 and/or 120, and allocate particular virtual processors to each of the LPARs 150A-150C. Hypervisor 108 can restrict the LPARs to use only the particular physical processors corresponding to the virtual processors allocated to each LPAR. Similarly, a hypervisor can partition the physical memory of the computer, such as by creating LMBs mapped to particular portions (or, pages) of PMBs. The hypervisor can allocate one or more particular LMBs to each LPAR. Hypervisor 108 can restrict the LPARs to use only the particular physical memory pages corresponding to particular logical pages of the LMBs allocated to each LPAR. Each of the LPARs can be unaware of the presence of the other LPARs or the physical processors and/or memory comprising the computer or allocated to other LPARs.

A hypervisor can interact with a management component of a virtualized computer to configure the LPARs and physical or virtual resources of the computer. For example, a management component, or "management console", can provide a graphical user interface (GUI) suitable for a human to interact with the computer. A management console can provide a command line interface (CLI) suitable for a program to interact with the computer. A management console GUI and/or CLI can include, for example, interfaces to determine how many LPARs to create, which resources to partition or virtualize and in what fractions, which virtual and/or physical resources to allocate to each LPAR, and/or when to activate (or, "boot") or terminate particular LPARs.

As used herein, "management console" refers to any component of a computer that participates in determining the configuration and/or management of virtual or physical resources and LPARs of a virtualized computer. A management console can be a component included in a virtualized computer; for example, a management console can be a component of, or can be, a service element of a virtualized computer. A management console can be a component of another computer or in communication with a virtualized computer (e.g., by means of a network connection to another computer).

Computer system 100 includes management console 140. Computer 102, or components thereof, can communicate with management console 140 by means of interfaces 142 and/or 144. Management console 140 can be a source of inputs to computer 102, and/or can be a consumer of outputs, or of results of operations of computer 102, or components thereof. Management console 140 can be a utility to manage, or administer, resources and/or operations of a computer, and/or components thereof. For example, a human user (e.g., using a GUI), or a program (e.g., using a CLI), can use management console 140 to determine the number of LPARs included in computer 102 and, optionally, the type of OSes included in each of the LPARs.

Management console 140 can be used to assign particular resources of computer 102 to LPARs included in computer 102, and/or to boot or shutdown particular LPAR, for example. Management console 140 can interact with hypervisor 108 as part of administering resources and/or operations of computer 102. Management console 140 can communicate with hypervisor 108 by means of, for example, interface 144. Management console 140 can communicate (e.g., by means of interface 142) with one or more of LPARs 150A-150C (referred to herein, collectively, as "LPARs 150"), and/or OSes 104A-104C 104C (referred to herein, collectively, as "OSes 104"). As a management console.

Interfaces between a console and a computer can be particular to whether a console is a component of the computer, or is embodied (e.g., in another computer) external to the computer. For example, if management console 140 is embodied external to computer 102, interfaces 142 and/or 144 can be network interfaces, or I/O device interfaces. Embodiments can implement interfaces 142 and 144 as different types of interfaces. For example, interface 142 can be an Ethernet interface between management console 140 and OS 104A and/or program 106, and interface 144 can be a different type of interface, such as an I/O bus or I/O link.

Management console 140 can be a component of computer 102 and interfaces 142 and/or 144 can be interfaces internal to computer 102. For example, interface 144 can be a messaging interface using a mailbox in a region of a memory (e.g., within memory 130) that can be shared by management console 140 and hypervisor 108. Interface 144 can include program function calls from management console 140 to hypervisor 108, and/or vice versa. Interface 144 can include interrupts signaled to console 140 and/or hypervisor 108, and/or can include data structures in in a region of a memory (e.g., within memory 130) that can be shared by console 140 and hypervisor 108.

LPARs in a virtualized computer can communicate with a hypervisor by means of a "hypervisor interface", such as hypervisor interface 146 in computer 102 between LPARs 150 and hypervisor 108. A hypervisor interface in a virtualized computer system can be any of a variety of interfaces suitable for an LPAR to communicate with a hypervisor. For example, interface 146 can be a set of program function calls from the LPARs 150 to hypervisor 108, messages exchanged between hypervisor 108 and LPARs 150, communications interfaces such as physical or virtual Ethernet connections between LPARs 150 and hypervisor 108, interrupts signaled to hypervisor 108 and/or to LPARs 150, and/or can include data structures in a memory (e.g., within memory 130) that can be shared by hypervisor 108 and LPARs 150. A hypervisor interface, such as 146, can be a combination of any of the foregoing.

Figure 2A:
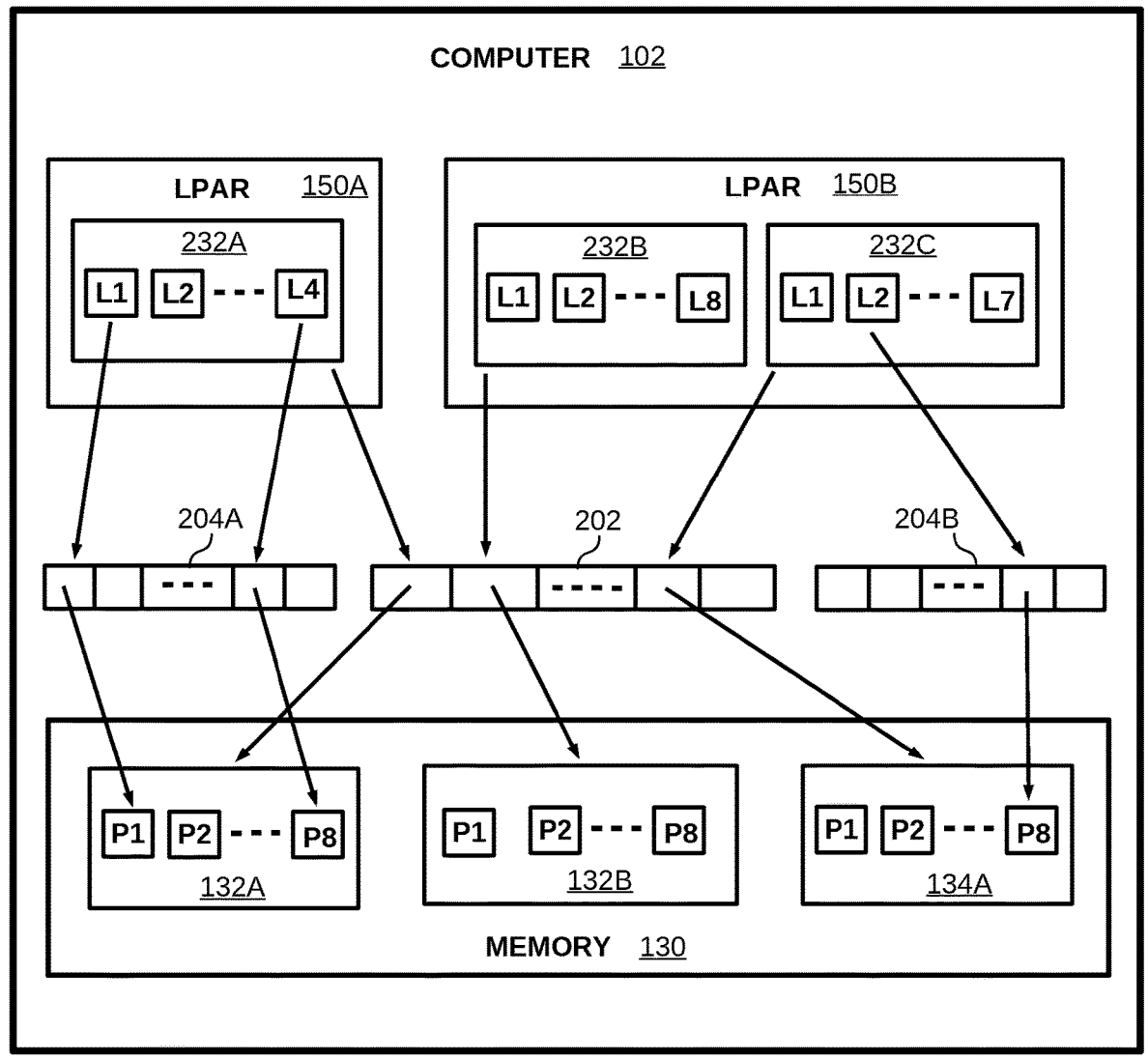
FIG. 2A is a block diagram illustrating mapping of logical to physical pages, according to the disclosure.

FIG. 2A illustrates an example of mapping logical pages of LMBs to physical pages of PMBs. For purposes of illustration, but not limiting to embodiments, FIG. 2A is described using the example virtualized computer 102 of FIG. 1. In embodiments, a hypervisor can form LMBs. For example, hypervisor 108 can form LMBs 232A-232C comprised of logical pages (e.g., logical pages L1-L4 of LMB 232A). A hypervisor can allocate particular LMBs to particular LPARs. For example, in FIG. 2A, LPAR 150A is allocated LMB 232A and LPAR 150B is allocated LMBs 232B and 232C.

A hypervisor can associate LMBs with particular PMBs in a memory of a computer. For example, hypervisor 108 can associate LMB 232A with PMB 132A, LMB 232B with PMB 132B, and LMB 232C with PMB 134A. A hypervisor can use an LMB table, for example, to associate a particular LMB with a particular PMB (or, pages of the PMB). In FIG. 2A hypervisor 108 can use LMB table 202 to "map" (i.e., make the association between) the LMBs to the PMBs. An LMB can have, for example, an LMB ID and a PMB can have, for example, a PMB ID. An LMB ID can select an entry in LMB table 202 and the entry can contain a corresponding PMB ID. In some embodiments, an LMB can be mapped to pages in each of more than one PMB, and an LMB table can include, for example, a list of PMBs, and a list of the pages included in each PMB, that maps the LMB to the PMBs, or pages thereof.

Logical pages within an LMB can be similarly mapped to physical pages in a corresponding PMB. In embodiments, a logical page can be associated with a physical page by means of, for example, a page table. For example, in FIG. 2A, page table 204A maps logical pages of LMB 232A to physical pages of PMB 132A, and page table 204B maps logical pages of LMBs 232B and 232C to physical pages of PMBs 132B and 134A. In a more specific example, page table 204A has an entry corresponding to a LPN of logical page L1 of LMB 232A, and the content of that entry can be the PPN of physical page P1 of PMB 132A. Page table 204A can operate similarly for various, or all, logical pages of one or more LMBs allocated to LPAR 150A. Page table 204B can operate similarly for various, or all, logical pages of one or more LMBs allocated to LPAR 150B.

While the example associations between LMBs and PMBs, and between corresponding logical and physical pages, illustrated in FIG. 2A are described as by means of mapping tables, the description is not intended to be limiting to embodiments. It would be apparent to one of ordinary skill in the art that other structures can accomplish such associations, such as lists or hardware elements (e.g., registers) within the scope of the disclosure. Further, while the example of FIG. 2A illustrates a page table associated with each LPAR, it will be understood by one of ordinary skill in the art that an embodiment can employ, for example, a single table that maps the logical addresses of all LMBs, for all LPARs collectively, or a combination of other tables or structures that can associate a logical page of an LMB allocated to one LPAR with a physical page in the memory of the computer.

In embodiments, program instructions executed by a processor can reference data (e.g., a byte or contiguous sequence of bytes) in a memory using a logical address (LA) of the data in a memory of the computer. In some embodiments, an LA can be a logical address of that data (e.g., a data byte or word) within a logical page of an LMB. In alternative embodiments, an LA referenced by a program instruction can be a virtual address (VA) of the data. For example, an OS can create a virtual address space to allocate to, or associate with, a program (or, programs) and the OS can map (e.g., by means of a mapping table within the OS) the virtual address space to logical pages within an LMB (or, alternatively, to pages within a PMB). A VA can correspond to a LA within a logical page of an LMB, for example. In some embodiments, a VA can differ from a corresponding logical address in a logical page of an LMB. As used herein, "LA" refers to any form of virtual or logical address of data in a memory that can be mapped to a corresponding PA (e.g., by means of a page table).

An LA can correspond to a physical address (PA) of the data as the data is stored in a physical page of a memory of a computer (e.g., a physical page in a PMB). In some embodiments, mapping tables 204a and 204B can be a "hardware page table (HPT)" and a hardware element of the computer can use the HPT to determine a PA corresponding to an LA of data in a memory. For example, a processor (or, a memory control or management unit, or other unit designed to translate logical to physical addresses) can access an HPT to translate a virtual address (VA) referenced in an instruction to the corresponding physical address (PA) in the physical memory of the computer. For purposes of illustrating the disclosure, but not limiting to embodiments, hereinafter page tables 204A and 204B are considered to be HPTs used by a processor (or other hardware element) of computer 102 to translate an LA of data referenced by the processor to a PA of a physical page of computer 102 memory 130.

In some embodiments, logical pages and corresponding physical pages are of a uniform size, such as (for example) 4 KB or 16 KB. An LA can correspond to a location (e.g., a particular byte or word offset) within a logical page, and the logical page can have a corresponding "logical page number (LPN)" within a set of logical pages (e.g., an LMB, or all LMBs collectively). For example, LPN "0" can be the lowest ordinal logical page in a set of contiguous pages, and increasing LPNs can correspond to successive logical pages within the set. Similarly, a PA can correspond to a location (e.g., a particular byte or word offset) within a physical page, and the physical page can have a corresponding "physical page number (PPN)" within a set of physical pages (e.g., a PMB, or all PMBs collectively). For example, PPN "0" can be the lowest ordinal physical page in a set of contiguous physical pages, and increasing PPNs can correspond to successive physical pages.

A page table can have entries corresponding to LPNs, and the content of each of the entries can be a PPN to which a corresponding LPN is mapped. For example, an HPT may contain LPN entries for each logical page of one or more LMBs allocated to an LPAR (or, all LMBs of a computer collectively). An LPN can select an entry in the table and the corresponding PPN can be extracted from that entry to translate an LA to a PA, for example.

In embodiments, a hypervisor can manage tables to map LMBs to PMBs (e.g., LMB table 202), and/or to map logical pages to physical pages (e.g., page tables 204A and/or 204B). A hypervisor, and/or hardware elements of a computer, can restrict access to the tables to only the hypervisor, and other programs (e.g., programs executing in an LPAR) can be prevented or prohibited from accessing the tables (or, other structures that associate logical memory blocks or pages with physical memory blocks or pages). Using the example of computer 102 of FIG. 1, hypervisor 108 can manage HPTs 204A and 204B.

A hypervisor can associate LMBs with PMBs, or portions thereof, at the time an LMB is allocated to an LPAR, at the time an LPAR is started (e.g., booted), and/or a time a program executing in an LPAR makes reference to a page (or to the LA of some data) within an LMB. A hypervisor can enter a PMB ID (for example), corresponding to a particular LMB or LMB ID, into an LMB table at the time the hypervisor creates the LMB, when allocating an LMB to an LPAR, or in response to a first reference by an LPAR to a logical page within an LMB.

A program, such as an OS, executing in an LPAR can request a hypervisor to map a logical page to a physical page, and the program can make the request at a time it attempts to first reference data within that logical page. For example, a processor executing in a computer can execute an instruction that references a particular LA, and the LA may be within a logical page that is not presently mapped by a page table to a physical page. The processor can generate a "page fault" exception, or interrupt, resulting from an instruction reference to an address that is not mapped to a physical page. A page fault exception or interrupt can invoke a "page fault handler" (e.g., a page fault handler program or function of an OS) within an LPAR to establish a translation from the LA to the PA of a physical page to enable the processor to resume execution using memory of that physical page.

In some embodiments, an LPAR (e.g., an OS within the LPAR) can establish a translation from an LA to a PA by invoking the hypervisor (e.g., by means of a program function call). A hypervisor can determine a physical page to map to the logical page, and the hypervisor can enter the physical page (e.g., the PPN of the page) into an HPT (e.g., an entry corresponding to the LPN of the logical page) that a processor (for example) accesses to translate instruction LAs to PAs. For example, an LPAR can call hypervisor 108, by means of a hypervisor function call of interface 146 (e.g., "hpt_enter_page"), to enter a logical page address translation into an HPT associated with that LPAR, such as HPT 204. In another function call of a hypervisor interface (e.g., a different hypervisor call, or different form of an "hpt_enter_page" function call), an LPAR can signal to the hypervisor to invalidate, or remove, a particular LA translation in an HPT.

In embodiments, an LPAR and/or a hypervisor can identify an LMB by an LMB ID. An LMB ID can itself be an address, such as the address of the first byte, or logical page, of the LMB relative to all LMBs created by a hypervisor. An LA, or a logical page corresponding to an LA, can operate to identify an LMB (e.g., by implication from its logical address). In alternative embodiments, an LMB ID can be some other identifier that uniquely identifies a particular LMB. In requesting a hypervisor to establish a translation from an LA to a PA in an HPT, an LPAR can, for example, provide one or more of the LA, the LPN of a logical page, or an LMB ID to the hypervisor in a hypervisor call.

The hypervisor can use the LA, LPN, and/or LMB ID to identify the LMB and associate the LMB with a corresponding PMB, and/or to associate the LPN with a corresponding PPN. In some embodiments, as part of establishing the translation, the hypervisor may determine that the LMB is not presently mapped to any PMB and may select a PMB to map from the LMB. Similarly, as part of establishing the translation, the hypervisor may determine that the logical page is not presently mapped to any physical page of a PMB and may select a physical page to map from the logical page.

In a virtualized computer, it can be advantageous for two or more LPARs to share the same physical page of the computer. For example, one LPAR in the computer can be a "server" LPAR and can make physical pages mapped from its LMBs accessible to one or more other, "client" LPARs. For purposes of the disclosure, "server LPAR" refers herein to an LPAR making physical pages allocated to it available for sharing with one or more other LPARs, and "client LPAR" refers herein to an LPAR sharing the server LPAR page(s).

Figure 2B:
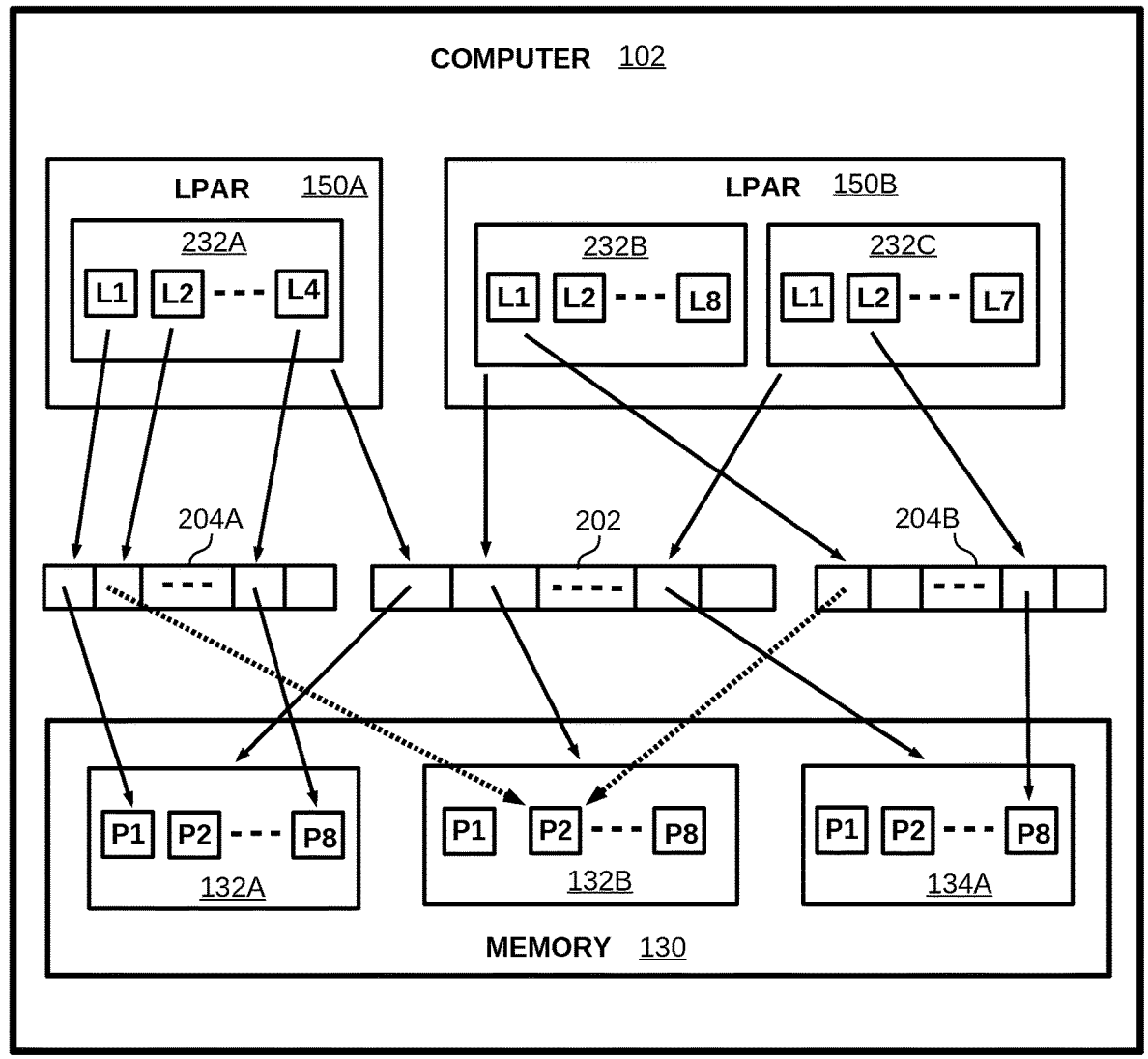
FIG. 2B is a block diagram illustrating an example mapping of logical to shared physical pages, according to the disclosure.

FIG. 2B illustrates an example of two LPARs sharing a common physical page. For purposes of illustration, but not limiting to embodiments, FIG. 2B continues the example of virtualized computer 102 of FIG. 1 and the LMB and page tables (HPTs) described in reference to FIG. 2A. FIG. 2B illustrates the mapping of virtual pages to physical pages shown in FIG. 2A, with the addition of two LPARs mapping a "shared" physical page in computer 102 memory 130. LMB 232A is allocated to LPAR 150A and contains a logical page L2 mapped through HPT 204A to physical page P2 of PMB 132B. For example, the LPN of LMB 232A logical page L2 can index HPT 204A and the indexed entry can contain the PPN of PMB 132B physical page P2.

The dashed arrow from the HPT 204A LPN entry (containing the PPN of PMB 132B physical page P2) indicates that LPAR 150A can be a server LPAR that has made physical page P2 of PMB 132A shareable by other LPARs. Accordingly, LPAR 150B can be a client LPAR that also maps PMB 132B physical page P2 to share the contents of that page with LPAR 150A (and, any additional LPARs, not shown, that may also map PMB 132B physical page P2). In FIG. 2A, LMB 232B is allocated to LPAR 150B, and logical page L1 of LMB 232B is mapped through HPT 204B to PMB 132B physical page P2 to enable LPAR 150B to share that physical page with LPAR 150A. Here again, the dashed arrow from the HPT 204B LPN entry (containing the PPN of PMB 132B physical page P2) indicates that PMB 132B physical page P2 is a shared physical page.

While the examples of FIG. 2A and FIG. 2B illustrate only 2 LPARs mapping virtual to physical addresses, it would be apparent to one of ordinary skill in the art that the scope of the disclosure is not limited to only two LPARs mapping virtual addresses to physical addresses in this manner, or to sharing the same physical page in a virtualized computer memory. It would be further apparent to one of ordinary skill in the art that the scope of the disclosure is not limited to LPARs sharing only a single physical page in a virtualized computer memory.

In embodiments, a server LPAR can make a particular physical page (or, set of pages) available to client LPARs to share the physical page(s), or the content thereof. The terms "server LPAR" and "client LPAR" can have many connotations, according to type of service a server LPAR offers to the client LPARs. As used herein, "server LPAR" refers to an LPAR that makes one or more physical pages allocated to it (e.g., mapped from a logical page of a server LPAR LMB) available to other LPARs to share. Correspondingly, as used herein, "client LPAR" refers to an LPAR that is authorized (e.g., by the server LPAR, or by a hypervisor) to share one or more physical pages of a server.

A "shared memory region (SMR)", as used herein, refers to a particular set of related physical pages that are made available by a server LPAR to share with client LPARs. Physical pages comprising an SMR can be related as part of a particular data structure or file, and can be, for example, contiguous physical pages within, or spanning, particular PMBs. Physical pages comprising an SMR can be pages that are non-contiguous, and can be within the same PMB or can be in different PMBs. A hypervisor can interact with LPARs to create and manage an SMR, and the hypervisor can use any of a variety of data structures to associate physical pages with one or more SMRs.

Figure 3:
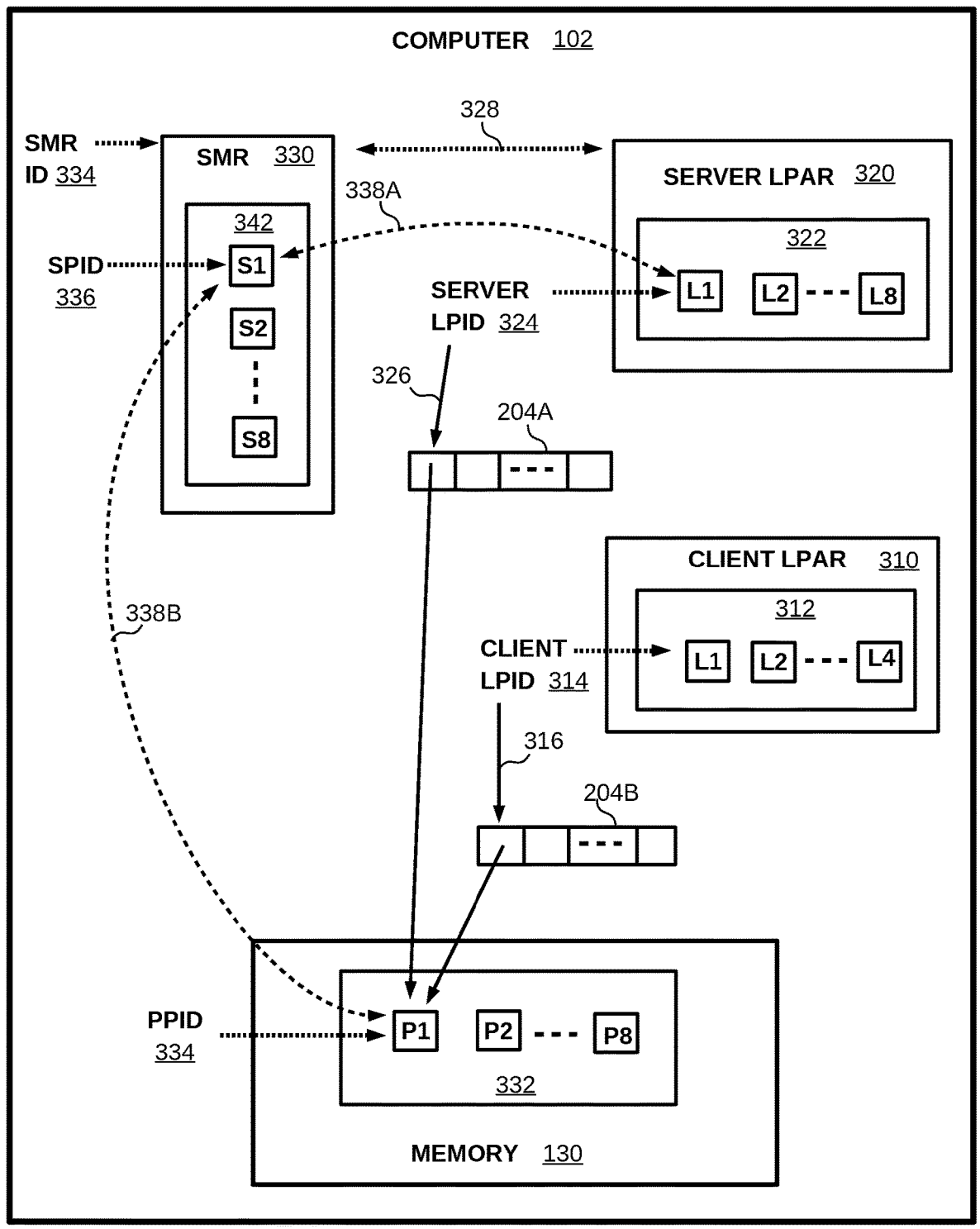
FIG. 3 is a block diagram illustrating an example shared memory region, according to the disclosure.

FIG. 3 illustrates an example of two LPARs using an SMR to share physical memory pages, and example relationships between logical pages of the respective LPARs, pages of the SMR, and physical pages in a memory of a computer. For purposes of illustrating the example, but not intended to limit embodiments, the example is described using the example virtualized computer 102 of FIG. 1, and the example page table mapping structures, within computer 102, of FIGS. 2A, and 2B.

As illustrated in FIG. 3, computer 102 includes client LPAR 310 and server LPAR 320. Server LPAR 320 includes set 322 of logical pages (e.g., pages of an LMB allocated to server 320), and client LPAR 310 includes set 312 of logical pages (e.g., pages of an LMB allocated to server 310). As illustrated in FIG. 3, each of the logical pages within each of sets 312 and 322 can be associated with a logical page ID (e.g., an LPN) that can identify each logical page. For example, logical page L1 in set 322 can be identified by, or associated with server LPID 324, and logical page L1 in set 312 can be identified by, or associated with, client LPID 314.

Memory 130 includes set 332 of physical pages (e.g., pages within a PMB). As illustrated in FIG. 3, physical pages within set 332 can be associated with physical page ID (e.g., a PPN) that can identify each physical page. For example, physical page P1 in set 332 can be identified by, or associated with PPID 334. Physical pages in set 332 can be mapped from the logical pages in sets 322 and/or 312. The mapping can be accomplished using page tables 204A and 204B, in the manner described in reference to FIGS. 2A and 2B, which can translate an LPID to a PPID. For example, server LPID 324 can index 326 an entry in page table 204A that contains the PPID (or, PPN) of physical page P1 in set 332, and client LPID 314 can index 316 an entry in page table 204B that contains the PPID (or, PPN) of physical page P1 in set 332.

FIG. 3 further illustrates SMR 330, which is associated 328 with server LPAR 320. SMR 332 includes set 342 comprised of shared pages, such as S1, S2, and so forth. An SMR can have an SMR identifier to identify it among the various SMRs of a virtualized computer. For example, in FIG. 3, SMR 330 is identified by SMR ID 334. An SMR identifier can be unique within the totality of SMRs possible in a particular virtualized computer, or an SMR identifier can be unique with respect to a particular LPAR (e.g., unique within a set of SMRs possible to identify for a particular server LPAR).

A shared page can be identified by a shared page ID (SPID), such as shared page S1 of shared page set 342 having SPID 336. A shared page ID can be a page number unique within a virtualized computer, or unique to a particular SMR (or, SMR identifier), for example. In another example, an SPID can be comprised of the identity of an SMR and a page offset, or page index, within that SMR.

The shared pages in set 342 (and comprising SMR 330) can correspond to logical pages in set 322 of server LPAR 320. For example, shared page S1 in set 342 can correspond 338A to server logical page L1 of set 332. A shared page can further correspond to a particular physical page in a memory of a computer. Physical pages corresponding to shared pages of an SMR (i.e., physical pages comprising an SMR) can be, for example, contiguous physical pages within, or spanning, particular PMBs. Alternatively, physical pages comprising an SMR can be pages that are non-contiguous. In some embodiments, server LPAR logical pages corresponding to shared pages of an SMR can be included in one or more LMBs allocated to the server LPAR, and the LMBs can correspond to particular PMBs of a virtualized computer.

A shared page of an SMR can correspond to a physical page in a memory by means of the shared page having a correspondence to a particular logical page, and that logical page being mapped to that particular physical page. For example, in FIG. 3, shared page S1 of shared page set 342 can correspond 338B to physical page P1 of set 332, and the correspondence can be by virtue of shared page S1 corresponding to logical page L1 of set 322, and logical page L1 of set 322 being mapped to page P1 of set 332 (e.g., by means of LPID 324 indexing 326 an entry of page table 204A having a PPID corresponding to page P1 of set 332).

A server LPAR can create an SMR, and the creation can be in response to a request from an application executing within the LPAR, or in response to some other event or stimulus, such as in response to a message from a management function that coordinates the interaction of applications executing in a plurality of LPARs. A hypervisor can interact with a server and/or client LPAR to create and/or manage an SMR, and the hypervisor can use any of a variety of data structures to associate physical pages with one or more SMRs.

Figure 4:
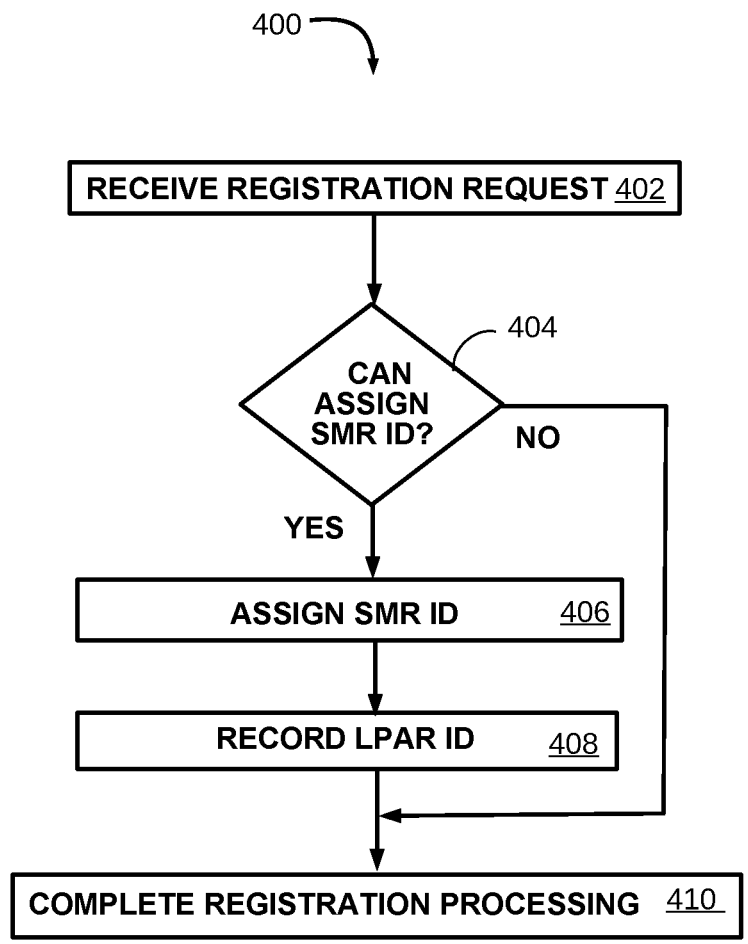
FIG. 4 is a flowchart that illustrates an example method to share pages of a server VM, according to the disclosure.

FIG. 4 illustrates an example method, 400, for a server LPAR to register an SMR. For purposes of illustrating the method, but not intended to limit embodiments, the method is described as performed by a hypervisor. At 402 the hypervisor receives an SMR registration request to register an SMR. The request can, for example, result from or be associated with an application in a server LPAR, or a server LPAR itself, creating an SMR. The registration request can comprise a request to assign an SMR ID, and (optionally, if needed) to allocate resources to the SMR, such as a data structure (or an entry within a data structure) within memory used by the hypervisor.

As used herein, for purposes of illustrating the examples of the disclosure, but not limiting to embodiments, "programming interface" refers to any of a variety of methods to communicate to or from a program component of a computer (e.g., a program) to perform an operation or receive results of an operation, such as a program interrupt or exception, a message, or a function call. For purposes of illustrating method 400, the registration request can be considered to be a function call, for example, of a hypervisor interface, such as interface 146 of FIG. 1.

At 404, the hypervisor determines if it can assign an SMR ID. Embodiments of a virtualized computer can limit the number of SMRs to a particular maximum number. Accordingly, the hypervisor can pre-determine a range of SMR IDs, such as 0 to the maximum number minus 1, and can determine, at 404, whether all SMR IDs are associated with an existing SMR, or some SMR IDs are not presently in use. If an SMR ID is available (i.e., not presently in use) the hypervisor can assign that SMR ID to the SMR associated with the registration request. In alternative embodiments, the number of SMRs may not be limited, and the hypervisor can determine, at 404, to generate a new SMR ID or, alternatively, that it can reuse an existing, presently unused SMR ID.

Accordingly, at 406, if the hypervisor determines that it can assign an SMR ID, the hypervisor selects (or, generates) an SMR ID to associate with the SMR. At 408 the hypervisor records the identifier of the server LPAR that created the SMR in association with the SMR ID. For example, the hypervisor can have a table of LPAR IDs that is indexed by an SMR ID, to associate a particular SMR with the LPAR that created it.

At 410, the hypervisor completes processing the SMR registration request. Completing processing of the SMR registration, optionally, can include recording additional information regarding properties of the SMR, such as identities of shared pages, identities of client LPARs permitted to access the shared pages, etc. If, at 404, the hypervisor determined that it could not assign an SMR ID to the SMR, completing registration processing can include returning a failure status to the server LPAR, or other originator of the SMR registration request (if not the server LPAR).

To access a physical memory page corresponding to a shared page of an SMR, a client LPAR can establish a mapping from a logical page allocated to the client LPAR to the physical memory page, such as illustrated in FIG. 3 wherein client LPAR 310 has mapped logical page L1 of set 312 to physical page P1 of set 332, which corresponds to shared page S1 of SMR 330. A client LPAR can establish such a mapping, for example, as part of an operation to establish sharing data in the shared pages of an SMR. However, logical to physical translation mechanisms (e.g., hardware page tables) can have limited resources that must be reassigned as a program executes. For example, a page table can have a fixed number of entries that can be fewer than the number of logical pages allocated to a program (or, an LPAR in which the program executes). Correspondingly, if a program references a logical address that is not presently mapped, the program can incur a page fault. A page fault handler program may need, then, to invalidate an existing mapping (e.g., using a Least Recently Used (LRU) or Least Frequently Used (LFU) criteria) to make a page table entry available to map the referenced logical page to a page in physical memory.

If a program maps more logical pages than are presently needed, or likely to be needed, the mappings can consume translation resources that could, alternatively, be available to map logical pages of other programs that are more likely to reference an unmapped logical page. Accordingly, it can be more efficient use of such limited translation resources to map any particular shared page of an SMR only at the time a program references a location within that page. Accordingly, in embodiments, a client LPAR can establish a mapping to a physical page corresponding to a shared page of an SMR at a time when a program (e.g., an application program, or the client LPAR OS) executing with the client LPAR attempts to access a data location within a shared page. For example, a client LPAR can associate a logical page with a shared page of an SMR and, at a later time, map the shared page in response to a page fault of a program referencing an address in the client LPAR logical page.

Figure 5:
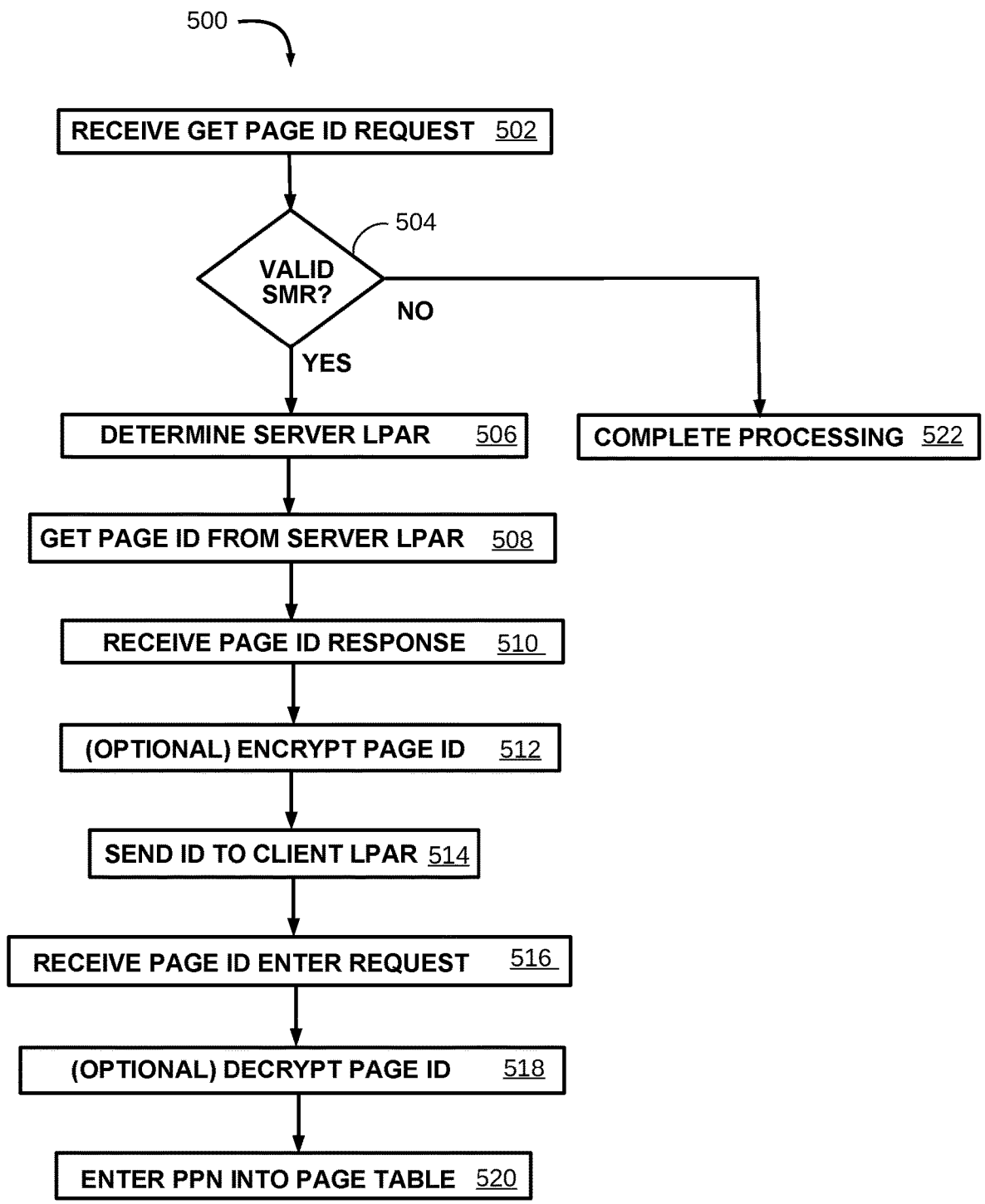
FIG. 5 is flowchart that illustrates an example method to map a client LPAR logical page to a shared page of an SMR, according to aspects of the disclosure.

FIG. 5 illustrates an example method, 500, for a client LPAR to map a shared page of an SMR in response to an access event, such as a page fault. Continuing in the manner of the description of method 400 of FIG. 4, for purposes of illustrating the method, but not limiting to embodiments, method 500 is described as performed by a hypervisor, and in the context of computer 102 of FIG. 1 and the mapping relationships and page tables of FIGS. 2A and 2B.

At 502, the hypervisor receives a get-page-ID request, to provide to a client LPAR the identity of a physical page corresponding to a shared page of an SMR. The request can be initiated or communicated by a client LPAR, or can be initiated or communicated by another component of a computer on behalf of the client LPAR. For example, the get-page-ID request can be a function call of a hypervisor interface, and a client LPAR can make the function call to the hypervisor. The request (or, function call) can include the identity of the SMR (e.g., an SMR ID), a description of the shared page, and, optionally, the identity of a client LPAR requesting the physical page identifier. The description of the shared page can be a page number, or any other description, that uniquely identifies that page within the set of shared pages comprising the SMR corresponding to the SMR ID.

At 504, the hypervisor determines if the SMR ID corresponds to a valid SMR (e.g., an SMR that is registered). If, at 504, he hypervisor determines that the SMR ID does not correspond to a valid SMR, at 522, the hypervisor completes processing the get-page-ID request. Completing processing, if the SMR ID is not associated with a valid SMR, can include providing a rejection (or, "Invalid SMR ID") status to the client LPAR.

If the SMR ID corresponds to a valid SMR, the hypervisor determines, at 506, the identity of the server LPAR that registered, or is otherwise associated with, the SMR. The hypervisor can use a table of LPAR IDs, for example, indexed by an SMR ID, to determine the server LPAR ID. At 508, the hypervisor communicates a request to the identified server LPAR to obtain the identity of the physical page corresponding to the shared page. The request can include the SMR ID of the SMR, the description of the shared page, and, optionally, the identity of the client LPAR. The hypervisor can use a variety of interfaces—such as function calls, interrupts, or messages—to communicate the request to the server LPAR.

At 510, the hypervisor receives a page-ID response, which can include the identity of the physical page corresponding to the shared page. The page-ID response can be, for example, a hypervisor call and the server LPAR can make the call to provide the identifier of the physical page as a call parameter. Alternatively, another component of a computer can provide the page-ID response, and/or the physical page identity, to the hypervisor on behalf of the server.

In embodiments, a page-ID response (or, function call) can provide a physical page identifier that is directly usable (e.g., a PPN or physical memory address) by a client LPAR to map the physical page to client LPAR logical page. However, in embodiments it can be advantageous (e.g., for secure isolation of data of one LPAR from other LPARs) to prevent any LPAR—server or clients—from having, or knowing, the actual, physical memory address or PPN of a physical page mapped to a logical page of an LPAR. Accordingly, a server LPAR can be limited to knowing only a logical or shared page identifier, and not the actual physical page identifier of a physical page corresponding to a shared page. For example, at 510, the hypervisor can receive an LPN of a server LPAR logical page, and can use the LPN (e.g., to index a page table) to determine a PPN (e.g., extracted from a page table entry) of the physical page corresponding to the shared page of the SMR.

To prevent the client LPAR, associated with the get-page-ID request, from knowing or determining the physical address of the requested physical (shared) page, at 512, a hypervisor can, optionally, determine a form of physical page identifier that is not directly usable (e.g., is not a PPN or physical memory address) by a client LPAR to map a logical page, or does not expose a physical memory address of a shared page to a client LPAR. For example, as illustrated in FIG. 5, to form a page identifier of the physical page corresponding to the shared page, which is not directly usable by a client LPAR, at 512 the hypervisor can encrypt the PPN (or other form of physical address) to provide an encrypted page ID.

At 514, the hypervisor communicates the physical page identifier, determined at 510 or 512, to the client LPAR associated with the get-page-ID request. The hypervisor can use a variety of interfaces—such as function calls, interrupts, or messages—to communicate the physical page ID to the client LPAR.

At 516, the hypervisor receives a page ID enter request, to map a logical page of a client LPAR to a physical page. The page ID enter request can be, for example, a hypervisor call and a client LPAR can make the call. The call can include an LPN corresponding to a logical page of the client LPAR to map the physical page, and the physical page can correspond to a shared page. The call can further include a physical page ID communicated to the client LPAR at 514.

518 is an optional operation that the hypervisor can perform if the physical page ID received at 516 is not a physical page address, or page ID (e.g., a PPN), that is directly usable to map the logical page to a physical page address. For example, as illustrated in FIG. 5, the physical page ID received at 516 can be an encrypted page ID generated at 512, and the hypervisor, at 518, can decrypt the physical page identifier to determine a PPN (for example) corresponding to that physical page.

At 520, the hypervisor completes the page ID enter processing of method 500. As illustrated, completing the page ID enter processing can include mapping the client LPAR logical page to the physical page corresponding to the shared page. For example, at 520 the hypervisor can enter a PPN (e.g., received at 516 or determined at 518) into a page table entry indexed by (or, corresponding to) the LPN provided in the page ID enter call.

While the example method 500 of FIG. 5 is described as performed by a hypervisor, it would be apparent to one of ordinary skill in the art that other functions of a virtualized computer, or of a computer in communication with a virtualized computer (e.g., a computer connected by means of interfaces 144 and/or 142 to virtualized computer 102 of FIG. 1), can perform the method or elements thereof. It would be further evident to one of ordinary skill in the art that the get-page-ID request, page ID response, and/or page enter requests can be other than a hypervisor function call, such as interrupts, exceptions, messages, or other means of communicating a request to a component performing the method.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for sharing a physical memory page among a plurality of logical partitions (LPARs) included in a computer, the method comprising:
   receiving, by a hypervisor, a registration request from a first LPAR, wherein the registration request is associated with a shared memory region (SMR), the registration request including a request for the hypervisor to assign an SMR identifier to the SMR and to allocate computing resources to the SMR;
   receiving, by the hypervisor and from a second LPAR that is different than the first LPAR, a get-page-ID request that includes an identity of a shared page and an identity of the SMR that includes the shared page, wherein the SMR is associated with the first LPAR;
   transmitting, by the hypervisor and to the first LPAR, a request to identify a physical page in a physical memory of the computer that corresponds to the shared page;
   receiving, by the hypervisor and from the first LPAR, in response to the get-page-ID request, a page ID response that comprises an identity of the physical page; and
   transmitting, by the hypervisor and to the second LPAR, in response to the page ID response, a first identity of the physical page, wherein the first identity of the physical page is an encrypted page number corresponding to the physical page.

2. The method of claim 1 further comprising:
   determining, by the hypervisor, in response to the registration request, the SMR identifier, the SMR identifier serving as the identity of the SMR; and
   transmitting, by the hypervisor and to the first LPAR, in response to the registration request, the SMR identifier.

3. The method of claim 1, wherein transmitting the first identity to the second LPAR comprises generating, by the hypervisor, the encrypted page number.

4. The method of claim 1 wherein the get-page-ID request is associated with a page fault incurred by the second LPAR.

5. The method of claim 1, wherein the request to identify the physical page that is transmitted to the first LPAR includes an identifier for the second LPAR.

6. The method of claim 1, wherein transmitting, by the hypervisor and to the second LPAR, the first identity of the physical page is performed using one or more function calls.

7. The method of claim 1, the method further comprising:
   receiving, by the hypervisor and from the second LPAR, a page ID enter request, the page ID enter request being a request to map a logical page of the second LPAR to the physical page, the page ID enter request including a logical page number associated with the logical page of the second LPAR and the encrypted page number corresponding to the physical page;
   decrypting, by the hypervisor, the encrypted page number to determine a physical page number of the physical page; and
   entering, by the hypervisor, the logical page number and the physical page number into a page table.

8. The method of claim 1 wherein the registration request is associated with an operation to create the SMR.

9. The method of claim 8, the method further comprising:
   recording, by the hypervisor, properties of the SMR, wherein the properties of the SMR include identities of all shared pages included in the SMR and identities of LPARs that are permitted to access the shared pages.

10. A computer program product for sharing a physical memory page among a plurality of logical partitions (LPARs) included in a computer, the computer program product comprising a computer readable storage medium having program instructions embodied therewith, the program instructions executable by a processor to cause the processor to perform a method comprising:

receiving, by a hypervisor, a registration request from a first LPAR, wherein the registration request is associated with a shared memory region (SMR), the registration request including a request for the hypervisor to assign an SMR identifier to the SMR and to allocate computing resources to the SMR;

receiving, by the hypervisor and from a second LPAR that is different than the first LPAR, a get-page-ID request that includes an identity of a shared page and an identity of the SMR that includes the shared page, wherein the SMR is associated with the first LPAR;

transmitting, by the hypervisor and to the first LPAR, a request to identify a physical page in a physical memory of the computer that corresponds to the shared page;

receiving, by the hypervisor and from the first LPAR, in response to the get-page-ID request, a page ID response that comprises an identity of a first logical page that corresponds to the shared page and the physical page;

transmitting, by the hypervisor and to the second LPAR, in response to the page ID response, a first identity of the physical page, wherein the first identity of the physical page is an encrypted page number corresponding to the physical page;

converting, by the hypervisor, in response to receiving a request to map a logical page of the second LPAR to the physical page, the encrypted page number to a physical page number; and entering, by the hypervisor, the physical page number into an address translation element, wherein the address translation element is operative to translate an identity of the physical page number to a physical page address of the physical page.

11. The computer program product of claim 10, wherein the method performed by the processor further comprises:

determining, by the hypervisor, in response to the registration request, the SMR identifier, the SMR identifier serving as the identity of the SMR; and transmitting, by the hypervisor and to the first LPAR, in response to the registration request, the SMR identifier.

12. The computer program product of claim 10, wherein the registration request is associated with an operation to create the SMR.

13. The computer program product of claim 10, wherein transmitting the first identity to the second LPAR comprises generating, by the hypervisor, the encrypted page number.

14. The computer program product of claim 10, wherein transmitting, by the hypervisor and to the second LPAR, the first identity of the physical page is performed using one or more function calls.

15. A system for sharing a physical memory page between logical partitions (LPARs), the system comprising:

a memory; and a processor communicatively coupled to the memory, wherein the processor is configured to perform a method comprising:

receiving, by a hypervisor, a registration request from a first LPAR, wherein the registration request is associated with a shared memory region (SMR), the registration request including a request for the hypervisor to assign an SMR identifier to the SMR and to allocate computing resources to the SMR;

receiving, by the hypervisor and from a second LPAR that is different than the first LPAR, a get-page-ID request that includes an identity of a shared page and an identity of the SMR that includes the shared page, wherein the SMR is associated with the first LPAR;

transmitting, by the hypervisor and to the first LPAR a request to identify a physical page that corresponds to the shared page, the physical page being in a physical memory of a computer that includes the first LPAR;

receiving, by the hypervisor and from the first LPAR, in response to the get-page-ID request, a page ID response that comprises an identity of a first logical page that corresponds to the shared page and the physical page;

transmitting, by the hypervisor and to the second LPAR, in response to the page ID response, a first identity of the physical page, wherein the first identity of the physical page is an encrypted page number corresponding to the physical page;

converting, by the hypervisor, the encrypted page number to a physical page number; and entering, by the hypervisor, the physical page number into an address translation element, wherein the address translation element is operative to translate an identity of the physical page number to a physical page address of the physical page.

16. The system of claim 15, wherein the method further comprises:

determining, by the hypervisor, in response to the registration request, the SMR identifier, the SMR identifier serving as the identity of the SMR; and transmitting, by the hypervisor and to the first LPAR, in response to the registration request, the SMR identifier.

17. The system of claim 15, wherein the registration request is associated with an operation to create the SMR.

18. The system of claim 15, wherein the address translation element comprises a page table.

19. The system of claim 15, wherein transmitting the first identity to the second LPAR comprises generating, by the hypervisor, the encrypted page number.

20. The system of claim 15, wherein the get-page-ID request is associated with a page fault incurred by the second LPAR.

\* \* \* \* \*